United States Patent Office 3,404,173
Patented Oct. 1, 1968

3,404,173
BIS(ALKYLXANTHATE)-ALKYNES
Nathan A. Edelson, Philadelphia, Pa., assignor to Monsanto Research Corporation, St. Louis, Mo., a corporation of Delaware
No Drawing. Filed Feb. 25, 1966, Ser. No. 529,956
3 Claims. (Cl. 260—455)

This invention relates to the reaction of the alkali metal salts of O-alkyl substituted xanthic acids with α,ω-dihalo-substituted alkynes and to the products thereof.

It is an object of this invention to provide new and useful bis(alkylxanthate) substituted alkynes.

It is another object of this invention to provide new compounds useful as biological toxicants, such as pesticides, fungicides and herbicides.

According to the invention there are prepared new and useful compounds of the formula:

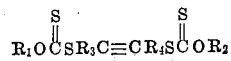

wherein each of $R_1$ and $R_2$ represents the same or different alkyl radicals of from 1 to 4 carbon atoms free of aliphatic unsaturation and each of $R_3$ and $R_4$ represent bivalent alkylene radicals of from 1 to 4 carbon atoms free of aliphatic unsaturation Preparation of the presently provided novel compounds may be effected by contacting an alkali metal salt of an alkyl substituted xanthic acid or, if novel compounds are desired with differing terminal O-alkyl radicals, a mixture of alkali metal salts of xanthic acids having differing alkyl substituents, with α,ω-dihalo substituted alkynes, according to the equation:

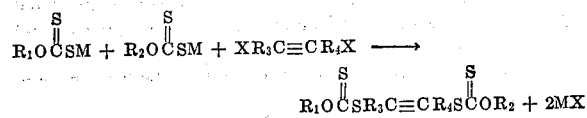

wherein each of $R_1$, $R_2$, $R_3$, and $R_4$ are as defined above, X represents a halogen element of atomic weight below 130 and M represents an alkali metal element selected from the class consisting of sodium and potassium.

There are shown below a number of the specific new compounds of the invention. It is not intended that this be a complete listing of all the compounds of the invention, but that it merely be illustrative thereof: 1,4-bis(methylxanthate)-2-butyne, 1,4-bis(ethylxanthate)-2-butyne, 1,5-bis(propylxanthate)-2-pentyne, 1,5-bis(butylxanthate)-2-hexyne, 1,6-bis(methylxanthate)-3-hexyne, 1,7-bis(ethylxanthate)-2-heptyne, 1,7-bis(propylxanthate)-3-heptyne, 1,8-bis(butylxanthate)-2-octyne, 1,8-bis(methylxanthate)-3-octyne, 1,8-bis(ethylxanthate)-4-octyne, 1,9-bis(propylxanthate)-2-nonyne, 1,9-bis(butylxanthate)-3-nonyne, 1,9-bis(methylxanthate)-4-nonyne, 1,10-bis(ethylxanthate)-2-decyne, 1,10-bis(propylxanthate)-3-decyne, 1,10-bis(butylxanthate)-4-decyne, 1,10-bis(methylxanthate)-5-decyne, and so forth.

In preparing the compounds of this invention useful alkali metal salts of alkyl substituted xanthic acids are, for example: potassium methylxanthate, sodium ethylxanthate, sodium propylxanthate, potassium butylxanthate, and so forth.

Useful α,ω-dihalo substituted alkynes are, for example: 1,4-difluoro-2-butyne, 1,5-dichloro-2-pentyne, 1,6-dibromo-2-hexyne, 1,6-diiodo-3-hexyne, 1,7-difluoro-2-heptyne, 1,7-dichloro-3-heptyne, 1,8-dibromo-2-octyne, 1,8-diiodo-3-octyne, 1,8-difluoro-4-octyne, 1,9-dichloro-2-nonyne, 1,9-dibromo-3-nonyne, 1,9-diiodo-4-nonyne, 1,10-difluoro-2-decyne, 1,10-dichloro-3-decyne, 1,10-dibromo-4-decyne, 1,10-diiodo-5-decyne, and so forth.

The new compounds of this invention may be prepared by simply contacting the xanthate compound with the desired disubstituted alkyne until reaction is complete. It is an advantage in moderating the reaction to add the reactants slowly and gradually to each other, though the reactants may be mixed all at once, together with a solvent or diluent if desired. Solvents or diluents which may be used to moderate the reaction and/or to facilitate stirring the mixture, and so forth, are, for example ketones, such as acetone, methylethyl ketone, diethyl ketone, and the like. The molar ratio of the reactants may vary, but since the reaction takes place by the condensation of two moles of xanthate with one mole of alkyne a 2:1 ratio is preferred. However, if desired an excess of one of the reactants may be used to assure complete reaction of the less reactive component. Excess reactant may be removed at the end of the reaction by, for example, extraction or distillation.

Reaction temperatures may vary. Useful temperatures are, for example, the reflux temperature of the reaction mixture, when solvents are used, or any desired temperature from about just above the freezing point to just below the decomposition point of the ingredients of the reaction mixture.

Catalysts are not required. Atmospheric pressure is satisfactory for conducting the reaction, though sub- or super-atmospheric pressures may be used if desired ranging from 0.1 millimeter of mercury up to 5,000 pounds per square inch. Reaction time may vary, in general, it will depend on the nature of the reactants used and on the temperature of the reaction mixture. Ordinarily reaction time will vary from less than one minute to several hours. Isolation of the product may be accomplished by standard procedures, such as filtration, distillation, extraction or crystallization, for example.

The compounds of this invention are generally stable well defined products, soluble in ketones, such as acetone and ethyl ketone and the like. The new compounds are useful for a variety of agricultural and industrial uses, for example, 1,4-bis(ethylxanthane)-2-butyne is useful as a pesticide and is particularly effective as a fungicide.

This invention will be further described with reference to the following specific examples. These examples are given for purposes of illustration only and are not to be taken as in any way restricting the invention.

Example 1

This example illustrates the preparation of a compound in accordance with this invention.

To a reaction flask containing 105 grams (g.) (about 0.66 mole) of potassium ethylxanthate in 1000 milliliters (ml.) of acetone is added 41 g. (about 0.33 mole) of 1,4-dichloro-2-butyne. An exothermic reaction occurs. The temperature of the reaction mixture increases from 19° to 30° C. in three hours. The reaction mixture is then refluxed for three hours at 56° C. and filtered. The filtrate is flash evaporated to yield a cloudy waxy fluid which is dried over magnesium sulfate and filtered.

The resultant product is 1,4-bis(ethylxanthate)-2-butyne, a uniformly amber liquid weighing 57.6 g. (about 60% theoretical yield), $n_D^{20}$ 1.6098.

Elemental analysis of this product confirms the assigned empirical formula $C_{10}H_{14}O_2S_4$.—Percent calculated: C, 40.8; H, 4.8; S, 43.5. Percent found: C, 40.8; H, 5.1; S, 43.4.

Example 2

This example illustrates the use of a compound of this invention as a fungicide.

One drop of an aqueous dispersion of 1,4-bis(ethylxanthate)-2-butyne present at a 10 parts per million concentration is placed into the well of a glass slide having a concavity. To it is added two drops of a conidial suspension of *V. inaequalis* (causative of apple scab) containing the microorganism at a rate of 625,000 spores per ml. of the liquid. The slide is then placed in a petri dish containing a little water, to provide a constant humidity, and covered. The petri dish containing the slide is then maintained for 24 hours at ambient temperature before observation for germination of the spores. After this period the slide is removed from the petri dish and the spores in the liquid are observed by means of a microscope for spore germination.

Only short germ tubes are observed to be grown by the spores, indicating substantial inhibition of spore germination by the 2-butyne compound.

By contrast 1,4-bis(ethylxanthate)-2-butylene, a known related compound when tested in the same manner produces no inhibition of spore germination.

Example 3

This example illustrates the use of a compound as provided by this invention for controlling the growth of microbiological organisms.

To test bactericidal activity, inoculations of *S. aureus* and *A. niger* are made on agar substrate supporting the growth of these organisms, to which has been added a bactericidal amount of 1,4-bis(ethylxanthate)-2-butyne. The inoculated plates are maintained under conditions supporting growth of these organisms. At a 1 part per 1000 concentration in the agar the 2-butyne compound causes substantially complete suppression of growth on each of the organisms.

Example 4

This example illustrates the use of a compound of this invention as a pesticide.

In insecticidal screening, activity for control of mosquito larvae is demonstrated as follows. 1,4-bis(ethylxanthate)-2-butyne is mixed with 50 ml. of water and 0.5 ml. of acetone to provide a 10 p.p.m. concentration in the liquid. Some early fourth-instar yellow fever mosquito larvae (*Aedes aegypti*) are placed in the containers holding the liquid and held there at room temperature for 24 hours. The 2-butyne compound produced a 50% mortality of the larvae in the liquid.

When 0.1 ml. of a mixture of three standard insecticides (of the chlorinated hydrocarbon, carbamate and organic phosphorous type, respectively) in acetone, which in itself would produce about a 5% mortality rate in the larvae, is now added to the partially killed larvae in the liquid. After another 24 hours an 80% kill is produced on the larvae in the mixture of the 2-butyne compound and synergist.

The new compounds of this invention are generally applied for toxicant use in the form of sprays or aerosols. Useful sprays may be prepared by dispersing the present products in water with the aid of a wetting agent to prepare aqueous dispersion which may be employed as by sprays. For example, a solution containing cyclohexanone and a polyalkylene glycol ether long chain alkylbenzene sulfonate emulsifier may be used to prepare such dispersion or emulsions. The product may also be applied to organisms as an oil-in-water emulsion spray. The new products may also be dispersed or dissolved in liquefied gasses such as fluorochloroethanes or methyl chloride and applied to pest organisms from aerosol bombs. Instead of employing liquids as carriers and diluents, toxicant dusts which contain the novel compounds as active ingredients may be prepared for example, by incorporating the new products of this invention with a solid carrier such as talc, bentonite, fuller's earth, and so forth.

The concentration of toxicant compound in the composition as applied will vary with the active ingredients, the manner of application, the species to be destroyed and the resistance or the organism to be sprayed, for example, and formulation and ratio of application are suitably adjusted in accordance with these factors.

It is apparent that this invention may be extended to areas beyond those specifically described and that many widely differing embodiments may be made without departing from the spirit and scope thereof as defined herein. Therefore, it is not intended to be limited except as indicated by the appended claims.

What is claimed is:

1. Compounds having the formula:

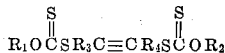

wherein each of $R_1$ and $R_2$ represent the same or different alkyl radicals of from 1 to 4 carbon atoms and each of $R_3$ and $R_4$ represent bivalent alkylene radicals of from 1 to 4 carbon atoms.

2. The compounds of claim 1 wherein each of $R_1$ and $R_2$ is ethyl.

3. The compounds of claim 1 wherein each of $R_3$ and $R_4$ is methylene.

References Cited

UNITED STATES PATENTS 3,226,417  12/1965  Bikales _____ 260—455

CHARLES B. PARKER, *Primary Examiner.*

D. R. PHILLIPS, *Assistant Examiner.*